(12) United States Patent
Woolf et al.

(10) Patent No.: US 8,627,197 B2
(45) Date of Patent: *Jan. 7, 2014

(54) SYSTEM AND METHOD FOR ANNOTATING AN ELECTRONIC DOCUMENT INDEPENDENTLY OF ITS CONTENT

(75) Inventors: Susan D. Woolf, Seattle, WA (US); Andrew Baird, Kirkland, WA (US); Sheng Jiang, Bellevue, WA (US); John L. Beezer, Redmond, WA (US); Darryl E. Rubin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 120 days.

This patent is subject to a terminal disclaimer.

(21) Appl. No.: 13/175,109

(22) Filed: Jul. 1, 2011

(65) Prior Publication Data

US 2011/0258527 A1 Oct. 20, 2011

Related U.S. Application Data

(63) Continuation of application No. 11/964,457, filed on Dec. 26, 2007, now Pat. No. 7,975,216, which is a continuation of application No. 09/455,805, filed on Dec. 7, 1999, now Pat. No. 7,337,389.

(51) Int. Cl.
*G06F 17/00* (2006.01)
*G06F 3/033* (2006.01)

(52) U.S. Cl.
USPC ........... 715/230; 715/232; 715/234; 715/263; 715/862; 345/179; 345/661

(58) Field of Classification Search
USPC .......... 715/230, 232, 234, 263, 862; 345/179, 345/661
See application file for complete search history.

(56) References Cited

U.S. PATENT DOCUMENTS

| 5,146,552 A | 9/1992 | Cassorla et al. |
| 5,237,648 A | 8/1993 | Mills et al. |
| 5,239,466 A | 8/1993 | Morgan et al. |

(Continued)

FOREIGN PATENT DOCUMENTS

| EP | 0342838 A2 | 11/1989 |
| EP | 0822501 A2 | 2/1998 |

(Continued)

OTHER PUBLICATIONS

"Hucklefine Defined", http://www.ylem.org/artists/mmosher/huck.html, Apr. 1990, 1-3.

(Continued)

*Primary Examiner* — Maikhanh Nguyen
(74) *Attorney, Agent, or Firm* — Merchant & Gould, P.C.

(57) ABSTRACT

A system, method, and apparatus for annotating an electronic document independently of its content is provided. According to one variation, a tablet and stylus-based computer is programmed with a document browser that permits a user to annotate documents viewed through the browser. The annotations are stored separately from the viewed document pages but are correlated with the pages such that when a previously annotated page is revisited, annotations relating to that page are retrieved and displayed on top of the page as an "ink" layer. Three different annotation modes are possible: ink, highlight, and erase. Each mode can be selected through a user interface supplied through the browser or through controls embedded in a document.

9 Claims, 10 Drawing Sheets

(56) References Cited

U.S. PATENT DOCUMENTS

| | | |
|---|---|---|
| RE34,476 E | 12/1993 | Norwood |
| 5,347,295 A | 9/1994 | Agulnick et al. |
| 5,390,138 A | 2/1995 | Milne et al. |
| 5,434,929 A | 7/1995 | Beernink et al. |
| 5,434,965 A | 7/1995 | Matheny et al. |
| 5,471,568 A | 11/1995 | Webb et al. |
| 5,473,742 A | 12/1995 | Polyakov et al. |
| 5,557,722 A | 9/1996 | DeRose et al. |
| 5,559,942 A * | 9/1996 | Gough et al. ............... 715/802 |
| 5,572,643 A | 11/1996 | Judson |
| 5,581,682 A | 12/1996 | Anderson et al. |
| 5,621,871 A * | 4/1997 | Jaremko et al. ............ 345/441 |
| 5,623,679 A | 4/1997 | Rivette et al. |
| 5,625,833 A | 4/1997 | Levine et al. |
| 5,630,125 A | 5/1997 | Zellweger |
| 5,632,022 A | 5/1997 | Warren et al. |
| 5,644,674 A | 7/1997 | Aihara et al. |
| 5,663,748 A | 9/1997 | Huffman et al. |
| 5,666,113 A | 9/1997 | Logan |
| 5,680,636 A | 10/1997 | Levine et al. |
| 5,682,439 A | 10/1997 | Beernink et al. |
| 5,687,331 A | 11/1997 | Volk et al. |
| 5,689,717 A | 11/1997 | Pritt |
| 5,717,860 A | 2/1998 | Graber et al. |
| 5,717,879 A | 2/1998 | Moran et al. |
| 5,719,595 A | 2/1998 | Hoddie et al. |
| 5,727,129 A | 3/1998 | Barrett et al. |
| 5,729,687 A | 3/1998 | Rothrock et al. |
| 5,737,599 A | 4/1998 | Rowe et al. |
| 5,745,116 A | 4/1998 | Pisutha-Arnond |
| 5,760,773 A | 6/1998 | Berman et al. |
| 5,761,485 A | 6/1998 | Munyan |
| 5,761,683 A | 6/1998 | Logan et al. |
| 5,784,058 A | 7/1998 | LaStrange et al. |
| 5,786,814 A | 7/1998 | Moran et al. |
| 5,790,818 A | 8/1998 | Martin |
| 5,799,268 A | 8/1998 | Boguraev |
| 5,799,318 A | 8/1998 | Cardinal et al. |
| 5,801,685 A | 9/1998 | Miller et al. |
| 5,801,687 A | 9/1998 | Peterson et al. |
| 5,802,516 A | 9/1998 | Shwarts et al. |
| 5,819,301 A | 10/1998 | Rowe et al. |
| 5,821,925 A | 10/1998 | Carey et al. |
| 5,822,720 A | 10/1998 | Bookman et al. |
| 5,826,025 A | 10/1998 | Gramlich |
| 5,832,263 A | 11/1998 | Hansen et al. |
| 5,832,474 A | 11/1998 | Lopresti et al. |
| 5,835,092 A | 11/1998 | Boudreau et al. |
| 5,838,313 A | 11/1998 | Hou et al. |
| 5,838,914 A | 11/1998 | Carleton et al. |
| 5,845,262 A | 12/1998 | Nozue et al. |
| 5,854,630 A | 12/1998 | Nielsen |
| 5,860,074 A | 1/1999 | Rowe et al. |
| 5,862,395 A | 1/1999 | Bier |
| 5,870,092 A | 2/1999 | Bedford-Roberts |
| 5,877,757 A | 3/1999 | Baldwin et al. |
| 5,893,126 A | 4/1999 | Drews et al. |
| 5,893,128 A | 4/1999 | Nauckhoff |
| 5,893,132 A | 4/1999 | Huffman et al. |
| 5,900,876 A | 5/1999 | Yagita et al. |
| 5,909,207 A | 6/1999 | Ho |
| 5,918,236 A | 6/1999 | Wical |
| 5,920,694 A | 7/1999 | Carleton et al. |
| 5,923,326 A | 7/1999 | Bittinger et al. |
| 5,924,104 A | 7/1999 | Earl |
| 5,931,912 A | 8/1999 | Wu et al. |
| 5,933,139 A | 8/1999 | Feigner et al. |
| 5,933,140 A | 8/1999 | Strahorn et al. |
| 5,937,416 A | 8/1999 | Menzel |
| 5,937,418 A | 8/1999 | Ferris et al. |
| 5,940,080 A | 8/1999 | Ruehle et al. |
| 5,948,040 A | 9/1999 | DeLorme et al. |
| 5,950,214 A | 9/1999 | Rivette et al. |
| 5,956,034 A | 9/1999 | Sachs et al. |
| 5,956,048 A | 9/1999 | Gaston |
| 5,978,818 A | 11/1999 | Lin |
| 5,982,370 A | 11/1999 | Kamper |
| 5,983,248 A | 11/1999 | DeRose et al. |
| 5,986,665 A | 11/1999 | Wrey et al. |
| 5,999,908 A | 12/1999 | Abelow |
| 6,011,537 A | 1/2000 | Slotznick |
| 6,012,055 A | 1/2000 | Campbell et al. |
| 6,018,334 A | 1/2000 | Eckerberg et al. |
| 6,018,342 A | 1/2000 | Bristor |
| 6,018,344 A | 1/2000 | Harada et al. |
| 6,018,742 A | 1/2000 | Herbert, III |
| 6,025,841 A | 2/2000 | Finkelstein et al. |
| 6,034,689 A | 3/2000 | White et al. |
| 6,035,330 A | 3/2000 | Astiz et al. |
| 6,037,934 A | 3/2000 | Himmel et al. |
| 6,038,598 A | 3/2000 | Danneels |
| 6,049,812 A | 4/2000 | Bertram et al. |
| 6,052,514 A | 4/2000 | Gill et al. |
| 6,054,990 A | 4/2000 | Tran |
| 6,055,538 A | 4/2000 | Kessenich et al. |
| 6,064,384 A | 5/2000 | Ho |
| 6,072,490 A | 6/2000 | Bates et al. |
| 6,076,917 A | 6/2000 | Wen |
| 6,081,829 A | 6/2000 | Sidana |
| 6,088,481 A | 7/2000 | Okamoto et al. |
| 6,091,930 A | 7/2000 | Mortimer et al. |
| 6,094,197 A | 7/2000 | Buxton et al. |
| 6,105,044 A | 8/2000 | DeRose et al. |
| 6,118,437 A | 9/2000 | Fleck et al. |
| 6,122,649 A | 9/2000 | Kanerva et al. |
| 6,128,007 A | 10/2000 | Seybold |
| 6,133,925 A | 10/2000 | Jaremko et al. |
| 6,141,007 A | 10/2000 | Lebling et al. |
| 6,144,375 A | 11/2000 | Jain et al. |
| 6,144,991 A | 11/2000 | England |
| 6,151,622 A | 11/2000 | Fraenkel et al. |
| 6,154,771 A | 11/2000 | Rangan et al. |
| 6,157,381 A | 12/2000 | Bates et al. |
| 6,163,778 A | 12/2000 | Fogg et al. |
| 6,173,287 B1 | 1/2001 | Eberman et al. |
| 6,181,344 B1 | 1/2001 | Tarpenning et al. |
| 6,181,399 B1 | 1/2001 | Tarpenning et al. |
| 6,184,886 B1 | 2/2001 | Bates et al. |
| 6,195,679 B1 | 2/2001 | Bauersfeld et al. |
| 6,195,694 B1 | 2/2001 | Chen et al. |
| 6,199,082 B1 | 3/2001 | Ferrel et al. |
| 6,205,419 B1 | 3/2001 | Fiedler |
| 6,205,455 B1 | 3/2001 | Umen et al. |
| 6,211,871 B1 | 4/2001 | Himmel et al. |
| 6,226,655 B1 | 5/2001 | Borman et al. |
| 6,229,502 B1 | 5/2001 | Schwab |
| 6,230,171 B1 | 5/2001 | Pacifici et al. |
| 6,239,792 B1 | 5/2001 | Yanagisawa et al. |
| 6,243,071 B1 | 6/2001 | Shwarts et al. |
| 6,243,091 B1 | 6/2001 | Berstis |
| 6,262,719 B1 | 7/2001 | Bi et al. |
| 6,266,772 B1 | 7/2001 | Suzuki |
| 6,271,840 B1 | 8/2001 | Finseth et al. |
| 6,272,484 B1 | 8/2001 | Martin et al. |
| 6,279,005 B1 | 8/2001 | Zellweger |
| 6,279,014 B1 | 8/2001 | Schilit et al. |
| 6,281,986 B1 | 8/2001 | Form |
| 6,286,002 B1 | 9/2001 | Axaopoulos et al. |
| 6,289,126 B1 | 9/2001 | Ishisaka |
| 6,289,362 B1 | 9/2001 | Van Der Meer |
| 6,301,590 B1 | 10/2001 | Siow et al. |
| 6,320,169 B1 | 11/2001 | Clothier |
| 6,320,577 B1 | 11/2001 | Alexander |
| 6,321,244 B1 | 11/2001 | Liu et al. |
| 6,331,866 B1 | 12/2001 | Eisenberg |
| 6,331,867 B1 | 12/2001 | Eberhard et al. |
| 6,335,727 B1 | 1/2002 | Morishita et al. |
| 6,340,967 B1 | 1/2002 | Maxted |
| 6,340,980 B1 | 1/2002 | Ho |
| 6,343,275 B1 | 1/2002 | Wong |
| 6,356,287 B1 | 3/2002 | Ruberry et al. |
| 6,369,811 B1 | 4/2002 | Graham et al. |
| 6,370,497 B1 | 4/2002 | Knowles |
| 6,377,983 B1 | 4/2002 | Cohen et al. |

(56) References Cited

U.S. PATENT DOCUMENTS

| | | |
|---|---|---|
| 6,384,815 B1 | 5/2002 | Huang |
| 6,389,434 B1 | 5/2002 | Rivette et al. |
| 6,393,422 B1 | 5/2002 | Wone |
| 6,397,264 B1 | 5/2002 | Stasnick et al. |
| 6,405,221 B1 | 6/2002 | Levine et al. |
| 6,407,757 B1 | 6/2002 | Ho |
| 6,418,421 B1 | 7/2002 | Hurtado et al. |
| 6,421,065 B1 | 7/2002 | Walden et al. |
| 6,425,525 B1 | 7/2002 | Swaminathan et al. |
| 6,437,793 B1 | 8/2002 | Kaasila |
| 6,437,807 B1 | 8/2002 | Berquist et al. |
| 6,446,110 B1 | 9/2002 | Lection et al. |
| 6,456,303 B1 | 9/2002 | Walden et al. |
| 6,457,013 B1 | 9/2002 | Saxton et al. |
| 6,460,058 B2 | 10/2002 | Koppolu et al. |
| 6,484,156 B1 | 11/2002 | Gupta et al. |
| 6,486,895 B1 | 11/2002 | Robertson et al. |
| 6,489,968 B1 | 12/2002 | Ortega et al. |
| 6,490,603 B1 | 12/2002 | Keenan et al. |
| 6,493,702 B1 | 12/2002 | Adar et al. |
| 6,529,620 B2 | 3/2003 | Arons et al. |
| 6,529,920 B1 | 3/2003 | Arons et al. |
| 6,535,294 B1 | 3/2003 | Arledge, Jr. et al. |
| 6,539,370 B1 | 3/2003 | Chang et al. |
| 6,549,220 B1 | 4/2003 | Hsu et al. |
| 6,549,878 B1 | 4/2003 | Lowry et al. |
| 6,560,621 B2 | 5/2003 | Barile |
| 6,571,211 B1 | 5/2003 | Dwyer et al. |
| 6,571,295 B1 | 5/2003 | Sidana |
| 6,573,907 B1 | 6/2003 | Madrane |
| 6,585,776 B1 | 7/2003 | Bates et al. |
| 6,597,377 B1 | 7/2003 | MacPhail |
| 6,631,496 B1 | 10/2003 | Li et al. |
| 6,636,238 B1 | 10/2003 | Amir et al. |
| 6,647,534 B1 | 11/2003 | Graham |
| 6,651,218 B1 | 11/2003 | Adler et al. |
| 6,662,310 B2 | 12/2003 | Lopez et al. |
| 6,675,356 B1 | 1/2004 | Adler et al. |
| 6,687,878 B1 | 2/2004 | Eintracht et al. |
| 6,697,997 B1 | 2/2004 | Fujimura |
| 6,710,790 B1 | 3/2004 | Fagioli |
| 6,714,214 B1 | 3/2004 | DeMello et al. |
| 6,760,884 B1 | 7/2004 | Vertelney et al. |
| 6,766,494 B1 | 7/2004 | Price et al. |
| 6,769,013 B2 | 7/2004 | Frees et al. |
| 6,772,139 B1 | 8/2004 | Smith, III |
| 6,788,316 B1 | 9/2004 | Ma et al. |
| 6,801,685 B2 | 10/2004 | Miller et al. |
| 6,820,111 B1 | 11/2004 | Rubin et al. |
| 6,865,713 B1 | 3/2005 | Bates et al. |
| 6,871,318 B1 | 3/2005 | Wynblatt et al. |
| 6,904,450 B1 | 6/2005 | King et al. |
| 6,956,593 B1 | 10/2005 | Gupta et al. |
| 6,957,233 B1 | 10/2005 | Beezer et al. |
| 7,028,267 B1 | 4/2006 | Beezer |
| 7,194,679 B1 | 3/2007 | Green |
| 7,203,910 B1 | 4/2007 | Hugh et al. |
| 7,337,389 B1 | 2/2008 | Woolf et al. |
| 7,496,830 B2 | 2/2009 | Rubin et al. |
| 7,568,168 B2 | 7/2009 | Beezer et al. |
| 7,975,216 B2 | 7/2011 | Woolf et al. |
| 2001/0031128 A1 | 10/2001 | Manbeck |
| 2002/0013834 A1 | 1/2002 | Esakov et al. |
| 2002/0016786 A1 | 2/2002 | Pitkow et al. |
| 2002/0097261 A1 | 7/2002 | Gottfurcht et al. |
| 2002/0099552 A1 | 7/2002 | Rubin et al. |
| 2002/0194260 A1 | 12/2002 | Headley et al. |
| 2005/0060138 A1 | 3/2005 | Wang et al. |
| 2007/0255810 A1 | 11/2007 | Shuster |

FOREIGN PATENT DOCUMENTS

| | | |
|---|---|---|
| EP | 0890926 A | 1/1999 |
| EP | 0902379 A2 | 3/1999 |
| JP | 11327789 | 11/1999 |
| JP | 2009080825 | 4/2009 |
| WO | WO 87/01481 A1 | 3/1987 |
| WO | WO 96/20908 A1 | 7/1996 |
| WO | WO 97/22109 A1 | 6/1997 |
| WO | WO 98/06054 A1 | 2/1998 |
| WO | WO 98/09446 A2 | 3/1998 |
| WO | WO 99/49383 A1 | 9/1999 |
| WO | 02/19919 | 1/2002 |

OTHER PUBLICATIONS

"Joke eBook", PrimaSoft PC, Inc., Electronic Book Series Version 1.0, Jul. 1998, 1-5.

"Tour of Korea Hypercard Stack", Grose Educational Media, "http://www.entrenet.com/.about.groedmed/kor2.html", 1996, 1-2.

"Adobe Acrobat 3.0 Review", http://www.hmug.org/Reviews/, Mar. 1997, 1-18.

"Bizweb2000.com—screenshots of an e-book", http://web.archive.org/web/*/http://www.bizweb2000.com/eshots.htm, published on May 1999, 1-4.

"Explore the Features of the Rocket eBook", wysiwyg://212http://www.rocketbook.com/Products/Tour/Index.html.

"Rocket eBook Using the Rocket eBook", http://www.rocketbook.com/Products/Faq/using.html.

"Softbook.RTM. Press the Leader in Internet-Enabled Document Distribution and Reading Systems", http://www.softbook.com/consumer/reader.asp.

Chiu et al., "NoteLook: Taking Notes in Meetings with Digital Video and Ink", Proceedings of ACM Multimedia'99, Oct. 1999, 10 pages.

Crespo et al., "Responsive interaction for a large Web application: The meteor shower architecture in the WebWriter II Editor", 1997, 15 pages.

Graefe et al, "Designing the muse: A Digital Music Stand for the Symphony Musician", Proceedings of Conference on Human Factors in Computing Systems, Apr. 13-18, 1996, 436-441.

Greenberg, "A Fisheye Text Editor for Relaxed-WYSIWIS Groupware", Chi'96, Conference companion on Human factors in computing systems: common ground, 1996, 2 pages.

Hirotsu et al., " Cmew/U-a multimedia Web annotation sharing system ", NTT Network Innovation Laboratories-Japan, Proceedings of the IEEE Region 10 Conference, TENCON 99, Sep. 15-17, 1999, 1, 356-359.

Kuo et al., "A Synchronization Scheme for Multimedia Annotation", Multimedia Information Networking Laboratory, Tamkang University-Taiwan, IEEE International Conference on Systems, Man, and Cybernetics (Computational Cybernetics and Simulation), Oct. 12-15, 1997, 1, 594-598.

Landay et al., "Making Sharing Pervasive: Ubiquitous Computing for Shared Note Taking", IBM Systems Journal, 1999, 38(4), 531-550.

Landay, "Using Note-Taking Appliances for Student Collaboration", 29th ASEE/IEEE Frontiers in Education Conference, IEEE Computer Society, Nov. 10-13, 1999, 12 c4/15-12c4/20.

Marshall, "Annotation from paper books to the digital library", ACM International Conf. on Digital Libraries, 1997, 10 pages.

Munyan, "Everybook, Inc: Developing the E-Book in Relation to Publishing Standards", http://www.futureprint.kent.edu/articles/munyan01.htm, accessed, Sep. 1998, 1-7.

Schilit et al., "Digital Library information Appliances", Proceedings of the third ACM conference on Digital Libraries, Jun. 23-26, 1998, 217-226.

Catlin, et al. "InterNote: Extending a Hypermedia Framework to Support Annotative Collaboration," Institute for Research in Information and Scholarship (IRIS), Brown University, Nov. 1989, pp. 365-378.

Dublin Core Metadata Element Set, Version 1.1: Reference Description 1999.

Dublin Core Metadata Initiative: User Guide Working Draft Jul. 31, 1998 1999.

Dublin Core Resource Types: Structurality Draft: Jul. 24, 1997, Feb. 27, 1998.

European Communication dated Mar. 7, 2008, in Application No. 00980988.0 (4 pages).

(56) References Cited

OTHER PUBLICATIONS

European Communication dated May 8, 2007, in Application No. 00980988.0 (3 pages).
European Communication dated Jun. 17, 2004, in Application No. 00980988.0 (2 pages).
European Communication dated Oct. 26, 2007, in Application No. 00980988.0 (3 pages).
International Search Report mailed Feb. 27, 2001, in Application No. PCT/US00/33129 (29 pages).
Japanese Notice of Allowance mailed Aug. 21, 2009, in Application No. 2001-544200 (6 pages).
Japanese Notice of Decision of Final Rejection mailed Oct. 28, 2008, in Application No. 2001-544200 (5 pages).
Japanese Notice of Rejection dated Apr. 24, 2009, in Application No. 2001-544200 (6 pages).
Japanese Notice of Rejection mailed Feb. 1, 2008, in Application No. 2001-544200 (14 pages).
Kristensen, A. "Formsheets and the XML Forms Language" (Mar. 1999), downloaded from the Internet on May 13, 2003 (16 pages).
Kunikazu, T. Patent Abstracts of Japan, Publication No. 11327789 for Color Display and Electronic Blackboard System, published Nov. 30, 1999.
Open eBook Forum, Open eBookTM Publication Structure 1.0, Sep. 16, 1999, downloaded on May 14, 2003 from http://www.ebxwg.org/oebps/eobps1.0/download/oeb1-oebps.htm (66 pages).
PhotoImpact 3.0, Ulead Systems Inc., 1996 (8 pages).
U.S. Appl. No. 09/455,754, Examiner's Answer to Appeal Brief mailed Jul. 2, 2007 (12 pages).
U.S. Appl. No. 09/455,754, Advisory Action mailed Sep. 28, 2004 (3 pages).
U.S. Appl. No. 09/455,754, Advisory Action mailed Oct. 5, 2005 (3 pages).
U.S. Appl. No. 09/455,754, Amendment and Response filed Apr. 27, 2005 (13 pages).
U.S. Appl. No. 09/455,754, Amendment and Response filed Mar. 1, 2004 (4 pages).
U.S. Appl. No. 09/455,754, Amendment and Response filed Mar. 27, 2006 (8 pages).
U.S. Appl. No. 09/455,754, Amendment and Response filed Jul. 21, 2004 (13 pages).
U.S. Appl. No. 09/455,754, Amendment and Response filed Sep. 13, 2005 (11 pages).
U.S. Appl. No. 09/455,754, Amendment and Response filed Oct. 27, 2003 (17 pages).
U.S. Appl. No. 09/455,754, Amendment filed May 8, 2003 (3 pages).
U.S. Appl. No. 09/455,754, Appeal Brief filed Feb. 8, 2007 (17 pages).
U.S. Appl. No. 09/455,754, Final Rejection mailed May 21, 2004 (10 pages).
U.S. Appl. No. 09/455,754, Final Rejection mailed Jun. 8, 2006 (10 pages).
U.S. Appl. No. 09/455,754, Final Rejection mailed Jul. 13, 2005 (10 pages).
U.S. Appl. No. 09/455,754, Non-Final Rejection mailed Jan. 27, 2005 (10 pages).
U.S. Appl. No. 09/455,754, Non-Final Rejection mailed May 27, 2003 (9 pages).
U.S. Appl. No. 09/455,754, Non-Final Rejection mailed Dec. 27, 2005 (10 pages).
U.S. Appl. No. 09/455,754, Patent Board Decision mailed Jun. 23, 2009 (16 pages).
U.S. Appl. No. 09/455,754, Reply Brief filed Sep. 4, 2007 (5 pages).
U.S. Appl. No. 09/455,805, Advisory Action mailed Feb. 24, 2004 (2 pages).
U.S. Appl. No. 09/455,805, Advisory Action mailed Feb. 24, 2006 (2 pages).
U.S. Appl. No. 09/455,805, Amendment After Final filed Jan. 26, 2006 (113 pages).
U.S. Appl. No. 09/455,805, Amendment and Response filed Feb. 12, 2004 (12 pages).
U.S. Appl. No. 09/455,805, Amendment and Response filed Jun. 18, 2003 (13 pages).
U.S. Appl. No. 09/455,805, Amendment and Response filed Aug. 14, 2007 (12 pages).
U.S. Appl. No. 09/455,805, Amendment and Response filed Aug. 23, 2006 (12 pages).
U.S. Appl. No. 09/455,805, Amendment, Response and Affidavit filed Aug. 11, 2005 (117 pages).
U.S. Appl. No. 09/455,805, Appeal Brief filed May 17, 2004 (25 pages).
U.S. Appl. No. 09/455,805, Final Rejection mailed May 15, 2007 (17 pages).
U.S. Appl. No. 09/455,805, Final Rejection mailed Sep. 16, 2003 (13 pages).
U.S. Appl. No. 09/455,805, Final Rejection mailed Oct. 31, 2005 (16 pages).
U.S. Appl. No. 09/455,805, Non-Final Rejection mailed Mar. 24, 2003 (9 pages).
U.S. Appl. No. 09/455,805, Non-Final Rejection mailed May 2, 2005 (13 pages).
U.S. Appl. No. 09/455,805, Non-Final Rejection mailed May 23, 2006 (14 pages).
U.S. Appl. No. 09/455,805, Notice of Allowance mailed Oct. 17, 2007 (6 pages).
U.S. Appl. No. 09/456,975, Amendment and Response Aug. 7, 2003 (9 pages).
U.S. Appl. No. 09/456,975, Amendment and Response Jun. 27, 2003 (12 pages).
U.S. Appl. No. 09/456,975, Amendment and Response filed Jan. 15, 2003 (17 pages).
U.S. Appl. No. 09/456,975, Amendment and Response filed Feb. 10, 2004 (8 pages).
U.S. Appl. No. 09/456,975, Amendment and Response filed Aug. 20, 2013 (11 pages).
U.S. Appl. No. 09/456,975, Final Office Action mailed Mar. 27, 2003 (10 pages).
U.S. Appl. No. 09/456,975, Non-Final Office Action mailed Oct. 22, 2002 (8 pages).
U.S. Appl. No. 09/456,975, Non-Final Office Action mailed Nov. 10, 2003 (12 pages).
U.S. Appl. No. 09/456,975, Notice of Allowance mailed May 18, 2004 (8 pages).
U.S. Appl. No. 10/875,174, Amendment and Response filed Jan. 22, 2008 (10 pages).
U.S. Appl. No. 10/875,174, Amendment and Response filed Jun. 7, 2007 (6 pages).
U.S. Appl. No. 10/875,174, Amendment and Response filed Nov. 15, 2006 (7 pages).
U.S. Appl. No. 10/875,174, Final Rejection mailed Feb. 7, 2007 (8 pages).
U.S. Appl. No. 10/875,174, Non-Final Rejection mailed Aug. 20, 2007 (10 pages).
U.S. Appl. No. 10/875,174, Non-Final Rejection mailed Aug. 23, 2006 (8 pages).
U.S. Appl. No. 10/875,174, Notice of Allowance mailed Oct. 20, 2008 (7 pages).
U.S. Appl. No. 10/891,050, Amendment and Response filed Apr. 6, 2007 (11 pages).
U.S. Appl. No. 10/891,050, Amendment and Response filed Oct. 9, 2007 (10 pages).
U.S. Appl. No. 10/891,050, Amendment and Response filed Nov. 15, 2006 (9 pages).
U.S. Appl. No. 10/891,050, Final Rejection mailed Feb. 6, 2007 (9 pages).
U.S. Appl. No. 10/891,050, Final Rejection mailed Dec. 19, 2007 (11 pages).
U.S. Appl. No. 10/891,050, Non-Final Rejection mailed Jun. 25, 2007 (10 pages).
U.S. Appl. No. 10/891,050, Non-Final Rejection mailed Aug. 7, 2006 (8 pages).
U.S. Appl. No. 11/964,457, Amendment and Response mailed Dec. 29, 2010 (10 pages).

(56) References Cited

OTHER PUBLICATIONS

U.S. Appl. No. 11/964,457, Non-Final Rejection mailed Sep. 29, 2010 (9 pages).
U.S. Appl. No. 11/964,457, Notice of Allowance mailed Mar. 1, 2011 (16 pages).
aha! 2.0 for Windows InkWriter The Power of Word Processing, The Convenience of Pen and Paper, (1995), 2 pages.
aha! Inkwriter of Magic Cap the Fastest, Most Convenient Way to Create Faxes, Notes and Messages, (1995), 2 pages.
aha! Inkwriter The Simplicity of Pen and Paper, the Power of Word Processing, (1995), 2 pages.
aha! Software Products, Web Page List of Products, Retrieved from: http://www.ahasoft.com//product.htm on Sep. 24, 1997 Aha Software Corporation, Mountain View, CA (1995), 5 pages.
Microsoft Corporation, Word 2000 (9.0 6926 Sp-3), 1999.
Nuvomedia, Inc. "Using the Rocket eBook," Retrieved from: http://www.rocketbook.com/Products/Faq/using.html, (1999) pp. 1-2.
PCT Application PCT/US00/33081, International Search Report mailed Mar. 26, 2001, 35 pages
PCT Application PCT/US00/33082, International Search Report mailed Feb. 27, 2001, 40 pages.
PCT Application PCT/US00/33127, International Search Report mailed.
U.S. Appl. No. 09/455,806, Amendment and Response filed Jul. 16, 2003, 10 pages.
U.S. Appl. No. 09/455,806, Amendment and Response filed Oct. 19, 2004, 4 pages.
U.S. Appl. No. 09/455,806, Amendment and Response filed Dec. 22, 2003, 13 pages.
U.S. Appl. No. 09/455,806, Notice of Allowance mailed Sep. 14, 2004, 9 pages.
U.S. Appl. No. 09/455,806, Office Action mailed Apr. 16, 2003, 6 pages.
U.S. Appl. No. 09/455,806, Office Action mailed Sep. 25, 2003, 9 pages.
U.S. Appl. No. 09/455,807, Advisory Action mailed Jun. 27, 2003, 2 pages.
U.S. Appl. No. 09/455,807, Amendment and Response filed Jan. 21, 2003, 6 pages.
U.S. Appl. No. 09/455,807, Amendment and Response filed Jan. 13, 2005, 12 pages.
U.S. Appl. No. 09/455,807, Amendment and Response filed Mar. 30, 2004, 9 pages.
U.S. Appl. No. 09/455,807, Amendment and Response filed Jun. 6, 2003, 9 pages.
U.S. Appl. No. 09/455,807, Amendment and Response filed Aug. 23, 2004, 15 pages.
U.S. Appl. No. 09/455,807, Notice of Allowance mailed May 31, 2005, 7 pages.
U.S. Appl. No. 09/455,807, Notice of Allowance mailed Sep. 19, 2005, 6 pages.
U.S. Appl. No. 09/455,807, Office Action mailed Apr. 9, 2003, 8 pages.
U.S. Appl. No. 09/455,807, Office Action mailed Jun. 15, 8 pages.
U.S. Appl. No. 09/455,807, Office Action mailed Jul. 19, 2002, 8 pages.
U.S. Appl. No. 09/455,807, Office Action mailed Nov. 29, 2004, 8 pages.
U.S. Appl. No. 09/455,807, Office Action mailed Dec. 30, 2003, 7 pages.
U.S. Appl. No. 09/455,807, Amendment and Response filed Sep. 5, 2003, 8 pages.
U.S. Appl. No. 09/455,808, Amendment and Response filed Sep. 10, 2003, 8 pages.
U.S. Appl. No. 10/460,226, Amendment and Response filed Mar. 20, 2007, 10 pages.
U.S. Appl. No. 10/460,226, Notice of Allowance mailed May 21, 2007, 7 pages.
U.S. Appl. No. 10/460,226, Notice of Allowance mailed Jul. 6, 2007, 2 pages.
U.S. Appl. No. 10/460,226, Office Action mailed Dec. 20, 2006, 7 pages.
U.S. Appl. No. 11/224,936, Notice of Allowance mailed May 21, 2009, 6 pages.
U.S. Appl. No. 11/224,936, Office Action mailed Oct. 17, 2008, 4 pages.
U.S. Appl. No. 11/234,268, Notice of Allowance mailed Dec. 16, 2008, 10 pages.
U.S. Appl. No. 12/466,721, Amendment and Response filed May 10, 2013, 10 pages.
U.S. Appl. No. 12/466,721, Amendment and Response filed Jul. 17, 2012, 11 pages.
U.S. Appl. No. 12/466,721, Amendment and Response filed Sep. 28, 2012, 13 pages.
U.S. Appl. No. 12/466,721,, Notice of Allowance mailed Jun. 4, 2013, 7 pages.
U.S. Appl. No. 12/466,721, Office Action mailed Apr. 17, 2012, 9 pages.
U.S. Appl. No. 12/466,721, Office Action mailed Aug. 1, 2012, 10 pages.
U.S. Appl. No. 13/175,109, Amendment and Response filed Apr. 1, 2013, 8 pages.
U.S. Appl. No. 13/175,109, Notice of Allowance mailed Apr. 22, 2013, 9 pages.
U.S. Appl. No. 13/175,109, Notice of Allowance mailed Jul. 8, 2013, 9 pages.
U.S. Appl. No. 13/175,109, Office Action mailed Dec. 31, 2021, 12 pages.

\* cited by examiner

FIG. 7

SYSTEM AND METHOD FOR ANNOTATING AN ELECTRONIC DOCUMENT INDEPENDENTLY OF ITS CONTENT

CROSS-REFERENCE TO RELATED APPLICATIONS

This application is a continuation of U.S. patent application Ser. No. 11/964,457, filed on Dec. 26, 2007, now issued as U.S. Pat. No. 7,975,216, which is a continuation of U.S. patent application Ser. No. 09/455,805, filed on Dec. 7, 1999, now issued as U.S. Pat. No. 7,337,389, both of which are incorporated herein by reference.

TECHNICAL FIELD

This invention relates generally to document browsers and pages that are displayed using such browsers. More particularly, the invention provides a method and apparatus for allowing a user to add annotations and other markings to an electronic document independently of the content of the document.

BACKGROUND OF THE INVENTION

Web browsers are conventionally used to display documents created with a standard descriptive language such as Hyper Text Markup Language (HTML). Documents written in such languages can be displayed with various visual and audio effects such as color, animation, sound effects, and the like. The documents may include text, bitmap images, graphics, and other types of content.

Web browsers (or, more generally, "document browsers") typically provide functions which permit a user to advance forward and backward among a series of related pages; to jump to a specified page; to jump to pages that are referenced via a so-called "hyperlink" embedded in a page; and to maintain a list of recently viewed pages. Although frequently used to navigate through web pages on the Internet, document browsers can be used to display pages that reside on a local area network or even a local computer on which the browser executes.

Recently, as computers have become smaller, it has become possible to run browsers on notebook computers, palm-sized computers, and so-called "tablet and stylus" computers. The latter devices typically comprise a thin computer roughly the size of a sheet of paper with a large writing surface that doubles as a display, and a stylus that substitutes for a keyboard. A user can display and edit documents using the stylus as a writing instrument.

One potential application for such hand-held computers is the display of mass-produced documents such as books, maps, and other descriptive material. For example, a user who purchases a textbook or fictional work on a CD-ROM or other medium can display the work using a small computer such as a tablet-based computer.

In some instances, a user may want to annotate or otherwise mark pages displayed on the computer. Using a conventional word processing program, a user can rearrange text, highlight certain words or phrases, or delete portions of the text. Such features require that the user have access to the underlying content (e.g., the descriptive material that forms the work). In the case of copyrighted materials, however, editing capabilities may not be available to modify the underlying materials. Certain text may be copy-protected or otherwise unavailable for editing using normal editing tools, or may not be in a format suitable for word processing. In such circumstances, there may be no practical way for a user to annotate such works. As one example, a student viewing a copy- or edit-protected textbook on a tablet-based computer may have no practical way of making notes directly in the textbook. Such a feature would be desirable notwithstanding the copy protection or unavailability of general editing functions for the document.

SUMMARY OF THE INVENTION

The present invention provides a method and apparatus for users to annotate documents in a document browser without changing the contents of the documents. According to one variation of the invention, a tablet and stylus-based computer is programmed with a document browser that permits a user to annotate documents that are viewed through the browser. The annotations are stored separately from the viewed document pages but are correlated with the pages such that when a previously annotated page is revisited, annotations relating to that page are retrieved and displayed on top of the page as an "ink" layer.

According to one variation of the invention, three different annotation modes are provided: ink, highlight, and erase. Each mode can be selected through a user interface supplied through the browser or through controls embedded in a document. The annotation functions can be implemented as an Active-X® control, as an Applet, or as dedicated code integrated into the browser. Other features and advantages of the invention will become apparent through the following description, the figures, and the appended claims.

BRIEF DESCRIPTION OF THE DRAWINGS

FIG. 7 shows a user interface on a computer screen including an opaque annotation 701 in a post-erase state, where the annotation has been partially erased.

DETAILED DESCRIPTION OF THE INVENTION

Figure 1:
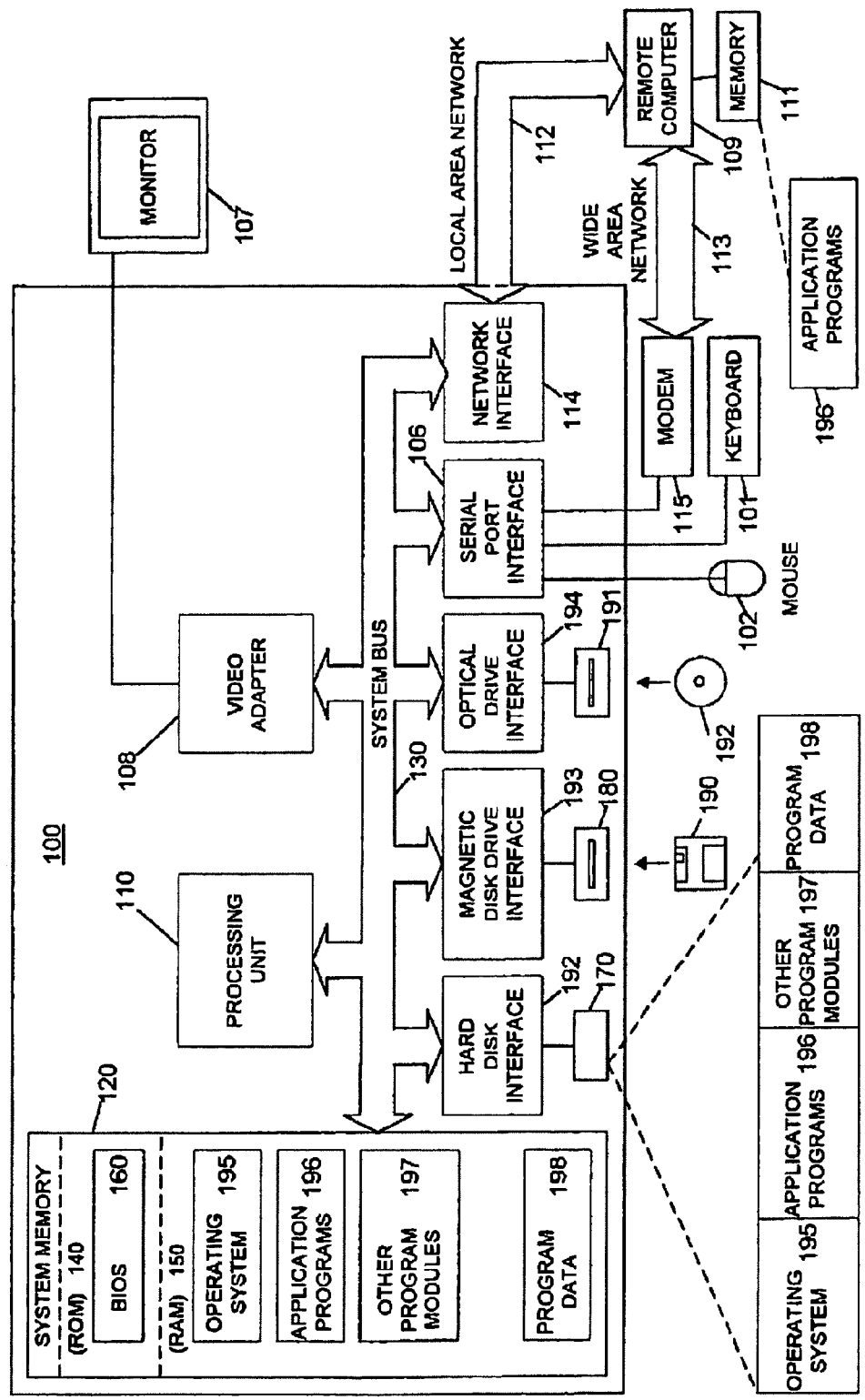
FIG. 1 shows a conventional general-purpose computing environment that can be employed in various embodiments of the invention.

FIG. 1 is a schematic diagram of a conventional general-purpose digital computing environment that can be used to implement various aspects of the invention. Computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory includes read only memory (ROM) 140 and random access memory (RAM) 150.

A basic input/output system 160 (BIOS), containing the basic routines that help to transfer information between elements within the computer 100, such as during start-up, is stored in ROM 140. Computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules can be stored on the hard disk, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner, or the like. These and other input devices are often connected to the processing unit 110 through a serial port interface 106 that is coupled to the system bus, but may be connected by other interfaces, such as a parallel port, game port or a universal serial bus (USB). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. Remote computer 109 can be a server, a router, a network PC, a peer device or other common network node, and typically includes many or all of the elements described above relative to computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
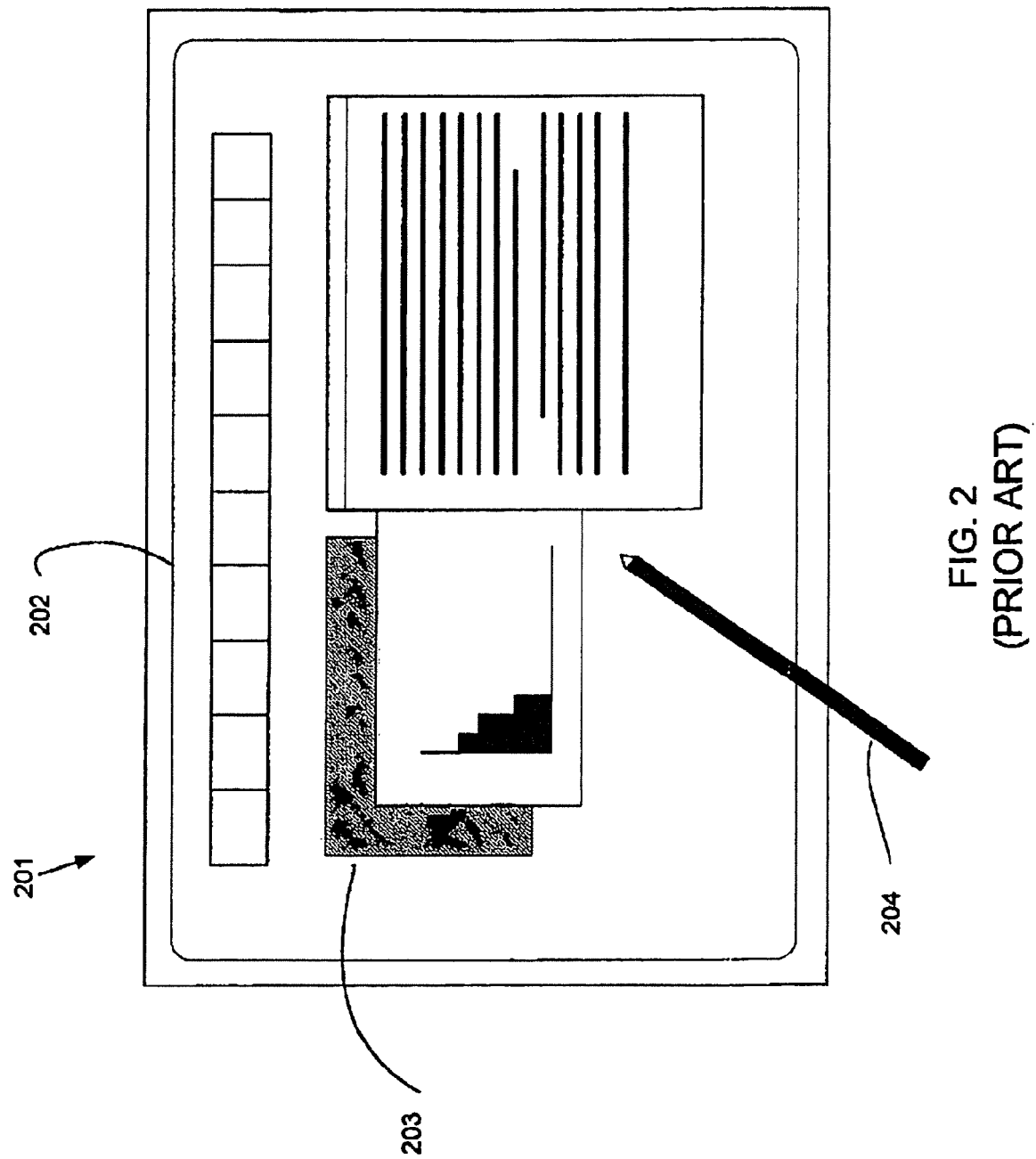
FIG. 2 shows a conventional tablet and stylus-based computer that can be used according to one aspect of the invention.

FIG. 2 shows a tablet and stylus computer that can be used in accordance with various aspects of the present invention. Any or all of the features, subsystems, and functions in the system of FIG. 1 can be included in the computer of FIG. 2. Computer 201 includes a large display surface 202 (e.g., a flat panel display) on which a plurality of windows 203 is displayed. Using stylus 204, a user can select, highlight, and write on the display area. Computer 201 interprets marks made using stylus 204 in order to manipulate data, enter text, and execute conventional computer application tasks such as spreadsheets, word processing programs, and the like. One commercially available tablet and stylus computer incorporating many of these features is the Stylistic 2300 computer sold by Fujitsu Personal Systems, Inc., of Santa Clara, Calif.

A stylus could be equipped with buttons or other features to augment its selection capabilities. In one embodiment, a stylus could be implemented as a "pencil" or "pen" in which one end constitutes a writing portion and the other end constitutes an "eraser" end which, when moved across the display, indicates that portions of the display are to be erased. Other types of input devices such as a mouse, trackball, or the like could be used. Additionally, a user's own finger could be used to select or indicate portions of the displayed image on a touch-sensitive or proximity-sensitive display. Consequently, the term "user input device" is intended to have a broad definition and encompasses many variations on well-known input devices.

Figure 3:
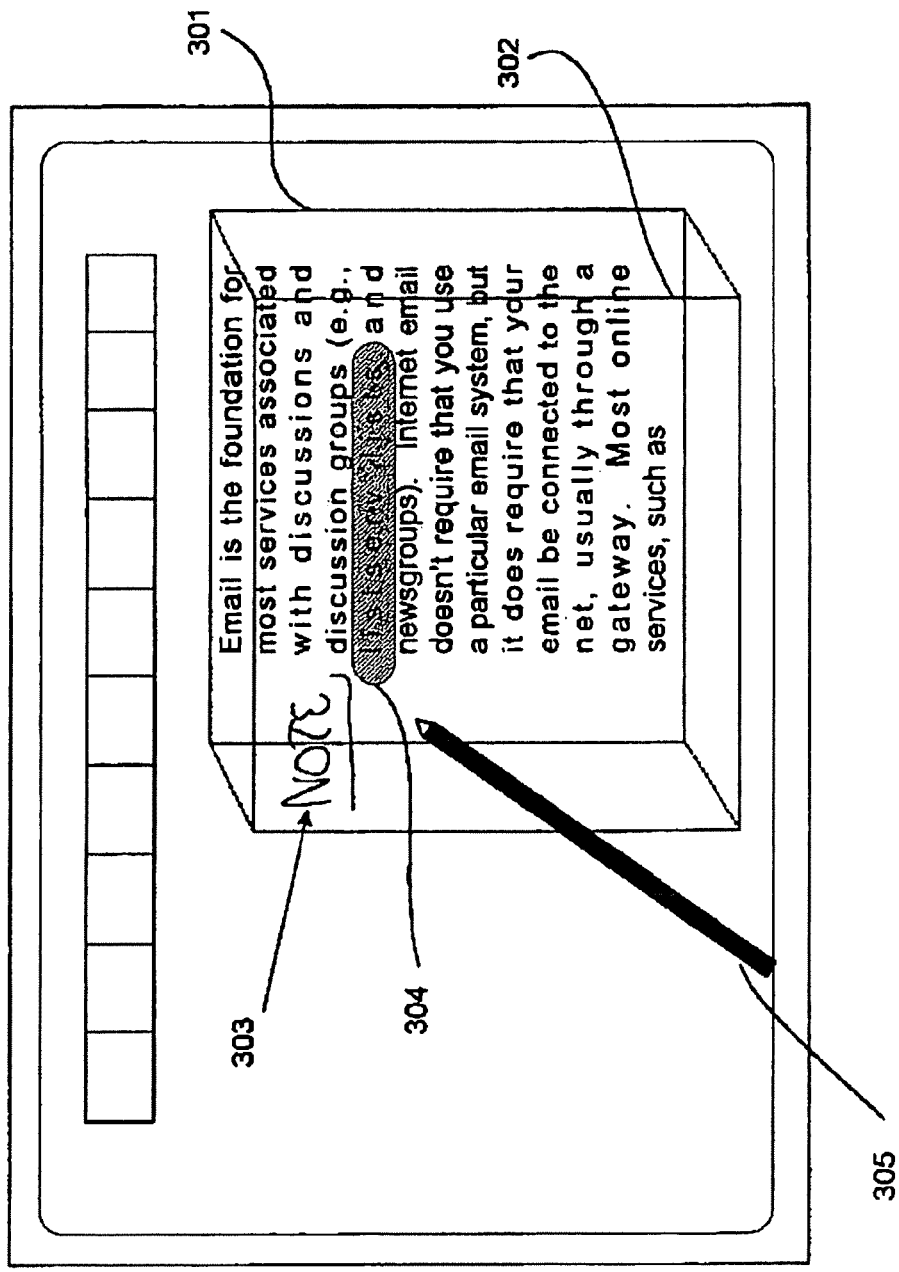
FIG. 3 is a conceptual view showing an ink layer 302 arranged on top of an underlying document page 301. The ink layer may include opaque and translucent markings.

FIG. 3 is a conceptual view showing a computer screen on which a document page 301 is displayed using a document browser. As is conventional, the document page contains text and/or graphics of interest to the user (i.e., "content"). In accordance with the invention, a special "ink" layer 302 is superimposed over the document page 301. Using stylus 305, the user can highlight certain parts of the document 304, which are then shown in a highlighted color (e.g., yellow) against the background text.

Also using stylus 305, the user can mark opaque annotations 303 on the computer display, which appear to be written on the page itself. (Although ink layer 302 is shown as a separate layer in FIG. 3, this view is for conceptual purposes only; the user would see only document page 301 with annotations superimposed over the text and/or graphics on the page). According to one aspect of the invention, annotations made by a user on document page 301 are maintained as a separate "ink" layer 302 that is superimposed over and blended with pixels on the document page. Consequently, even though the annotations appear to be made directly on the underlying document, they are actually maintained in a separate display layer blended with the document page being viewed.

In one embodiment, annotations are specific to each user, such that other users who view the same document will not see a previous user's annotations. This feature can be implemented using log-ins or other user identifiers. For an identical document retrieved at two different remote computers each having the inventive features, annotations made on one remote computer would not show up on the other remote computer, since the annotations are made independently of the document content. It is, however, within the scope of the invention to permit sharing of annotations if desired.

Although the inventive principles are described with respect to a tablet and stylus computer, these principles can be applied to other types of computers, including desktop systems, notebook computers, and the like. Many types of input devices, such as touch-sensitive displays and the like, can be used to indicate those portions of the display that are to be annotated. Moreover, as explained above, many variations on a basic stylus are of course possible, including an embodiment in which the stylus includes a writing end and an "erasing" end.

Figure 4:
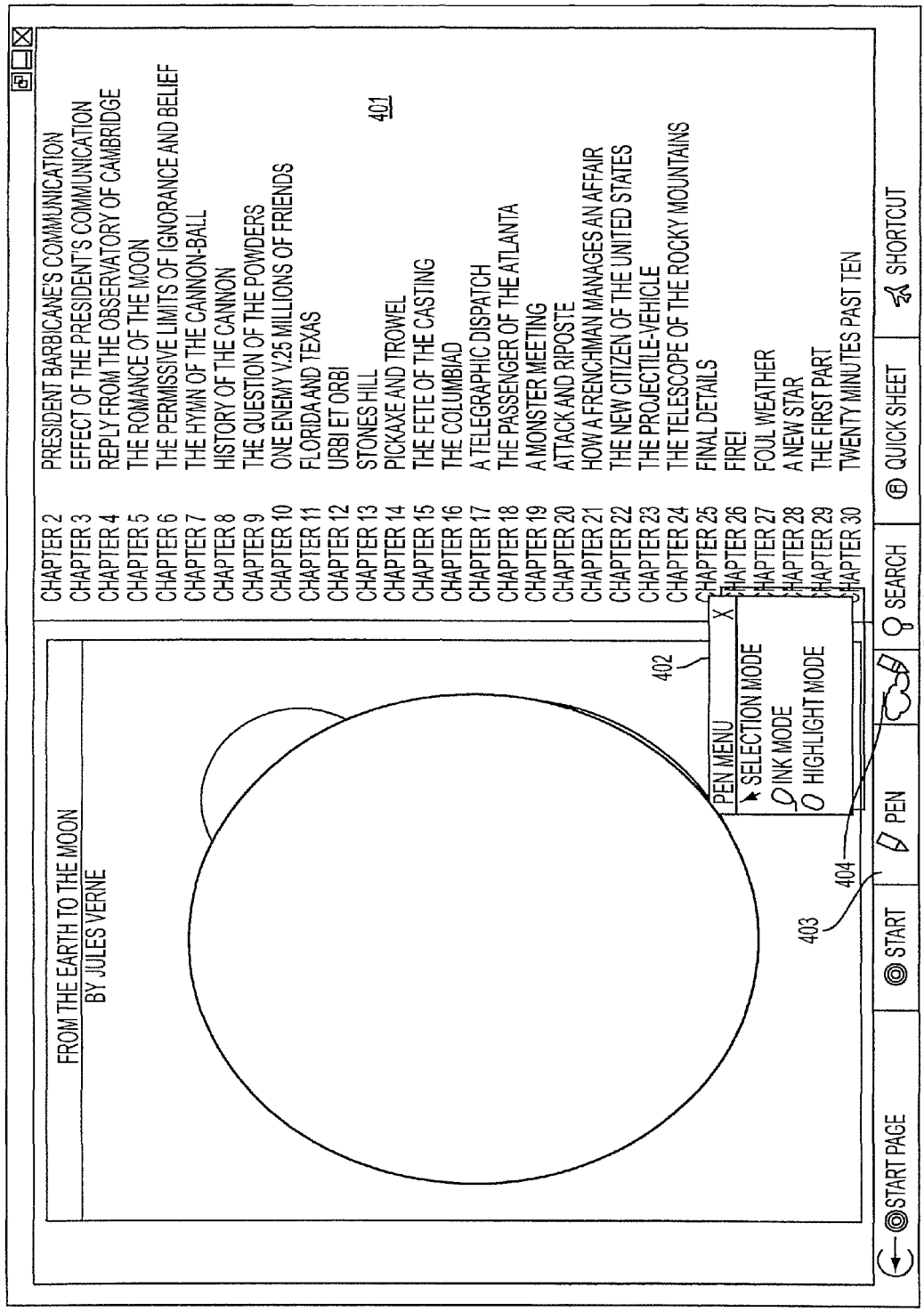
FIG. 4 shows a user interface on a computer screen including a menu 402 that permits a user to select from among a plurality of annotation modes on a displayed document.

FIG. 4 shows a user interface on a computer screen on which a document page 401 is displayed using a document browser. In accordance with one embodiment of the invention, the user interface includes an annotation mode selection menu 402 that permits a user to select from among a plurality of annotation modes for a displayed document. By tapping the stylus on pen button 403, the user can cause the annotation mode selection menu 402 to be displayed. A mode indicator 404 indicates the current annotation mode for the document browser.

According to one variation of the invention, these modes can include an "ink" mode, a "highlight" mode, and an "erase" mode. Additionally, a "selection" mode permits the user to switch to normal browser functions. As shown in FIG. 4, the user interface is already in "erase" mode (indicated by mode indicator 404), so that "erase" is not shown as one of the available modes in menu 402.

It is not necessary to provide an explicit "mode selection" feature as described above; instead, mode selection can be implicit in the manner by which the input device is used. As one example, a stylus could be used to provide an ink mode when the stylus is used as a writing implement; a highlighting mode when the stylus is held a certain way or when a button is pressed on the stylus; and an erase mode when an "erasing" end of the stylus is moved across portions of the display. As another example, one of the modes (e.g., the ink mode) could be established as a default mode when a user input device is manipulated, with other modes being selected based on additional user inputs or manipulations or even voice commands, for example. Many other variations are of course possible.

Figure 5:
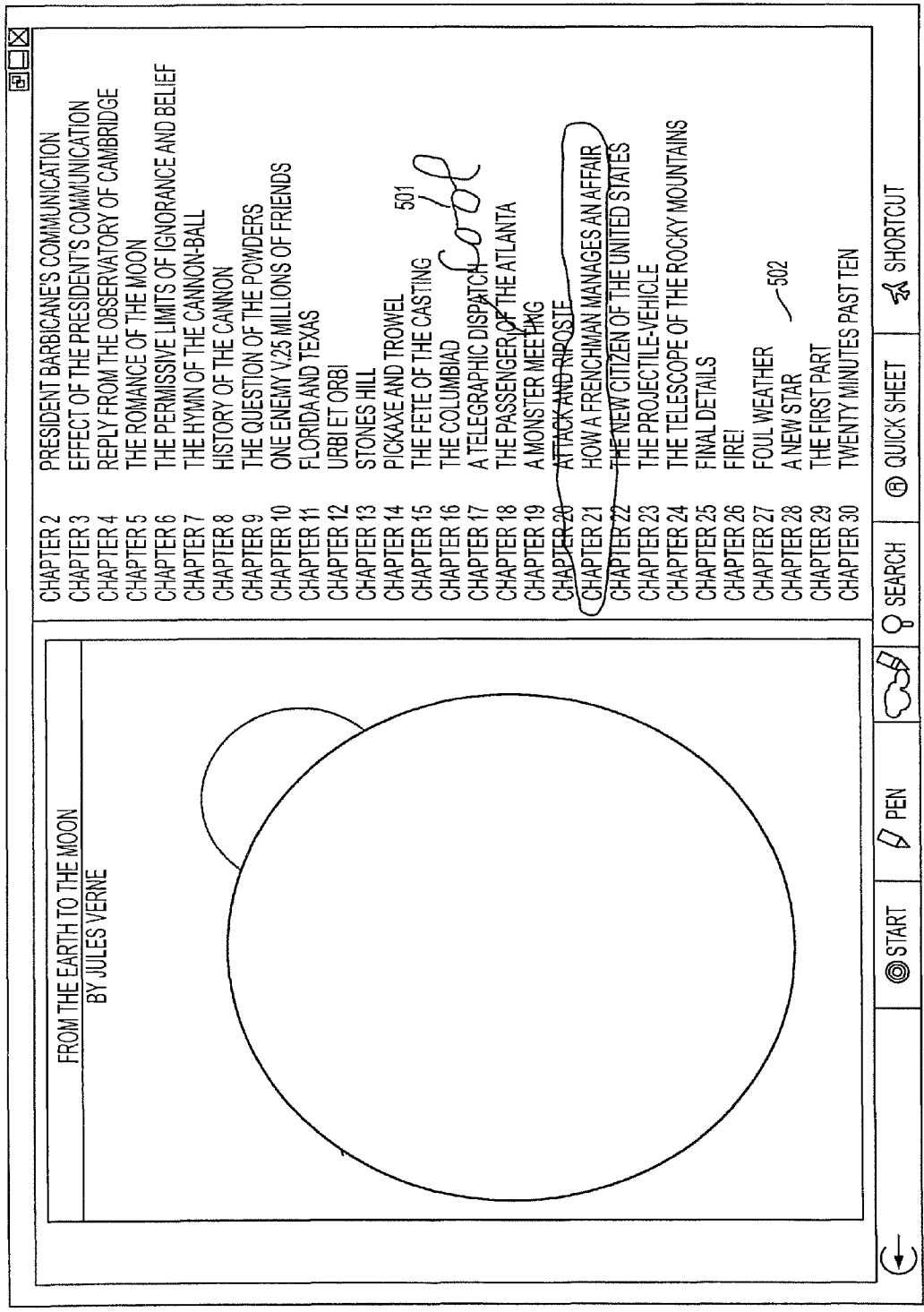
FIG. 5 shows a user interface on a computer screen including an opaque annotation 501 and a highlighted annotation 502, both superimposed over a displayed document.

FIG. 5 shows a user interface on a computer screen including the document of FIG. 4. Using the "ink" mode, the user has annotated a portion of the document 501 with an opaque ink color (e.g., black or blue). The user has also highlighted a different portion of the document 502 using the "highlight" mode. The highlighted portion 502 appears in a translucent color (e.g., yellow) superimposed over the underlying document. Using the "ink" and "highlight" modes, the user is able to annotate pages viewed through the document browser as needed.

Figure 6:
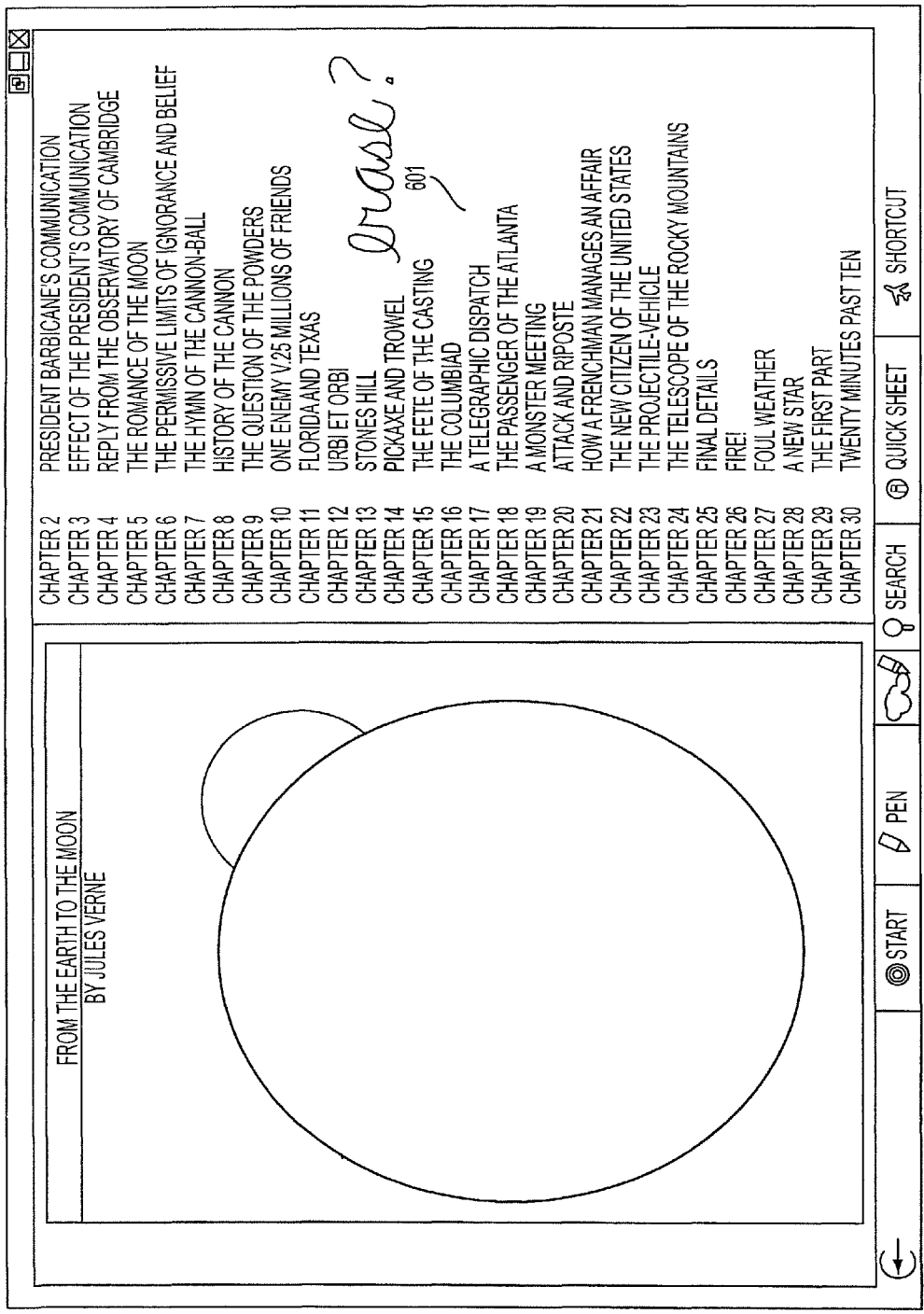
FIG. 6 shows a user interface on a computer screen including an opaque annotation 601 in a pre-erase state.
Figure 7:
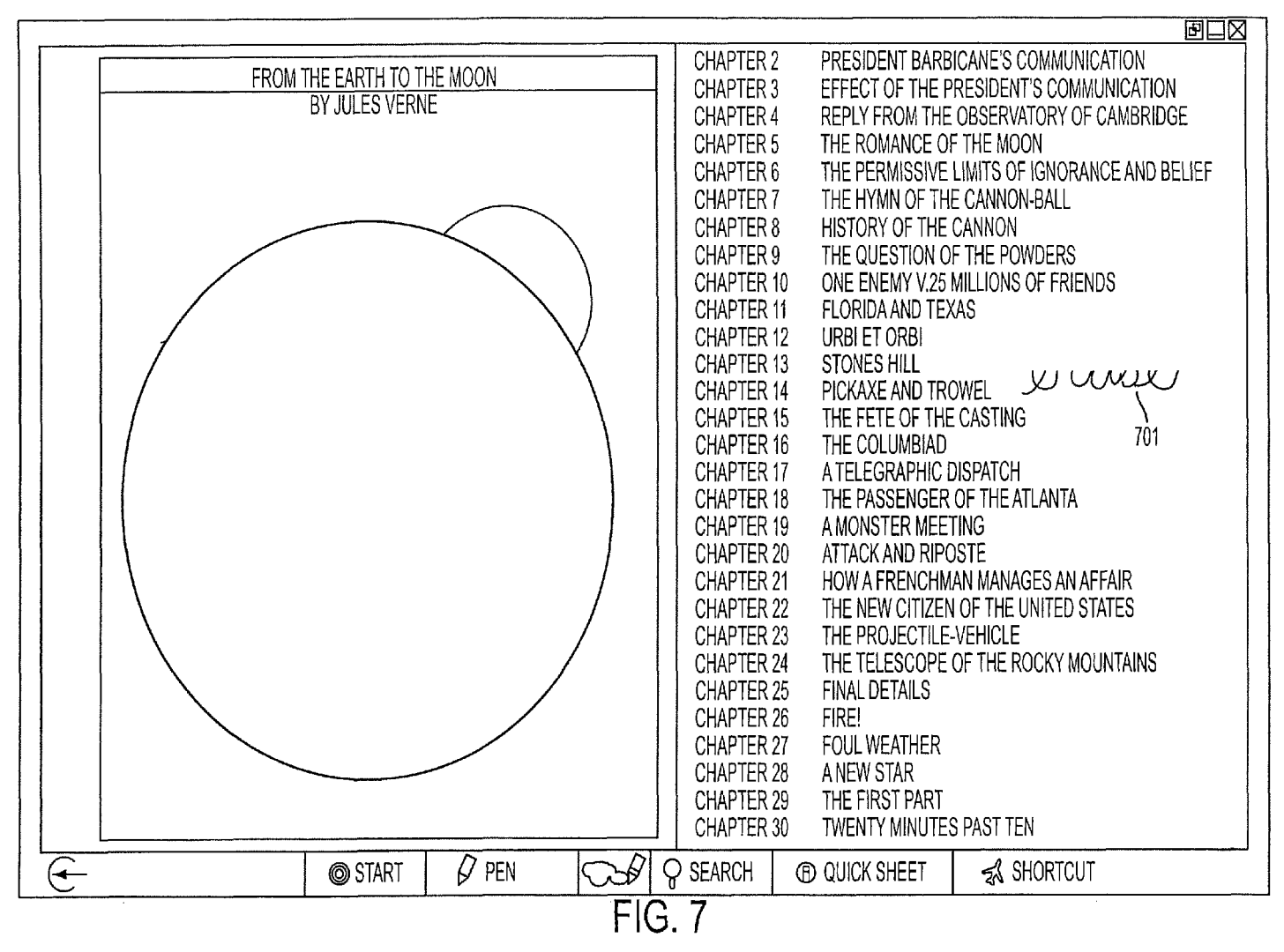

FIGS. 6 and 7 show one possible approach for implementing an "erase" mode. FIG. 6 shows a pre-erase screen in which the user has annotated a document page using an opaque ink color 601. FIG. 7 shows the same screen of FIG. 6 after the user has selected the "erase" mode and moved the stylus across a portion of the annotated region 601, leaving a partially erased annotation 701. Using the "erase" mode, the user can remove previous annotations from the computer screen. The width of the eraser function can be varied to suit various applications, or it can even be user-selectable.

Figure 8:
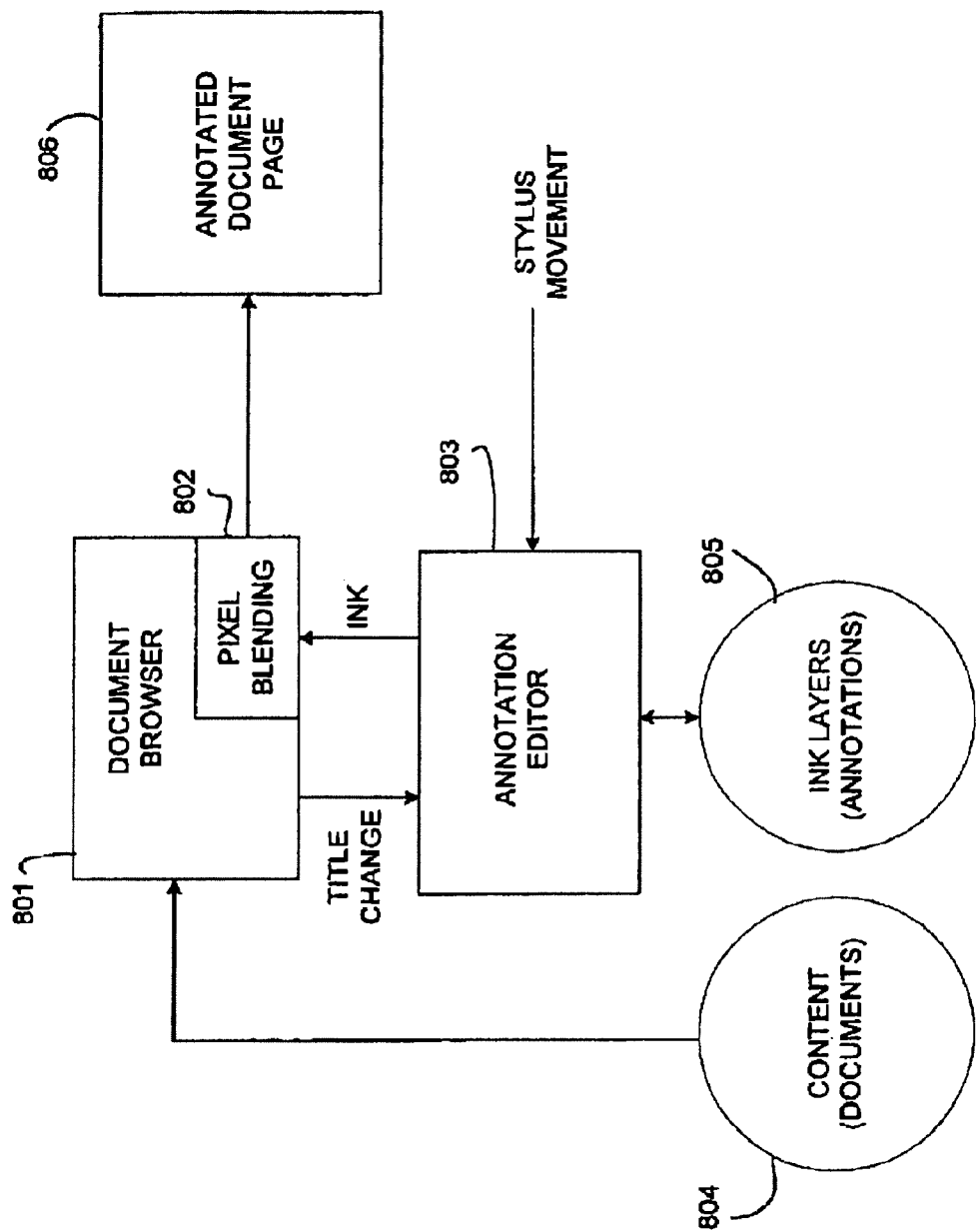
FIG. 8 shows one possible software design for implementing various principles of the invention.

FIG. 8 shows one possible software design for implementing various principles of the invention. As shown in FIG. 8, a document browser 801 permits a user to retrieve and view content in the form of documents from a document storage area 804. The documents can be stored locally on the user's computer (e.g., on CD-ROM disks and the like), or they can be stored remotely and retrieved across a network such as the Internet. Annotation editor 803 retrieves and stores annotations in "ink layers" stored in a storage device or area 805. As with document storage, ink layer storage area 805 can be local or remotely located.

Annotations retrieved from storage area 805 are provided to pixel blending function 802, which is indicated as a newly provided function within document browser 801. Alternatively, pixel blending function 802 can be provided separately (e.g., in the operating system, for example). In general, pixel blending function 802 blends pixels from a document page with corresponding pixels from an annotation or "ink" layer mapped to that document page, and generates a blended pixel image that is displayed as an annotated document page 806.

In one embodiment, each opaque annotation pixel replaces a corresponding pixel on a document page, whereas each translucent annotation pixel (e.g., highlighting) is blended with a corresponding pixel value on a document page to produce a different color from that in the original document. Pixel blending functions such as alpha blending are well known and no further elaboration of this feature is required.

Annotations can be saved as "strokes" in a data structure and stored locally in a file associated with the currently displayed page of the document. Each stroke can comprise a stroke type (e.g., annotate, highlight or erase), a stroke width, and a stroke color in addition to coordinates indicating the stroke trajectory. In various embodiments, annotation storage occurs automatically, such that whenever the input device is released (or lifted), a new stroke is automatically stored.

Alternatively, it is of course possible to store annotations as a bitmap image having the same or similar dimensions as the presently displayed document page, such that the annotation image can be superimposed over the document page. Combinations of these approaches are of course possible. For example, opaque annotations could be stored in a data structure, while highlighting could be stored as a bitmap image.

According to one embodiment, document browser 801 generates a title change event to annotation editor 803 each time a different document page is selected through document browser 801. This permits annotation editor 803 to retrieve previously stored annotations for a page, and to create a new annotation file for a newly displayed page. Annotation editor 803 intercepts stylus movements from a stylus or other cursor movement device and provides them to document browser 801 after any annotation processing has been performed. In one embodiment, browser 801 can constantly generate "screen paint" commands that are intercepted so that a blended image is continuously generated.

Annotation editor 803 can be implemented as an ActiveX® control element, as an Applet, or as other forms of software functions. Annotation editor 803 and any related functions can be embedded into a document viewed through browser 801, such that viewing the document provides the annotation functions.

Figure 9A:
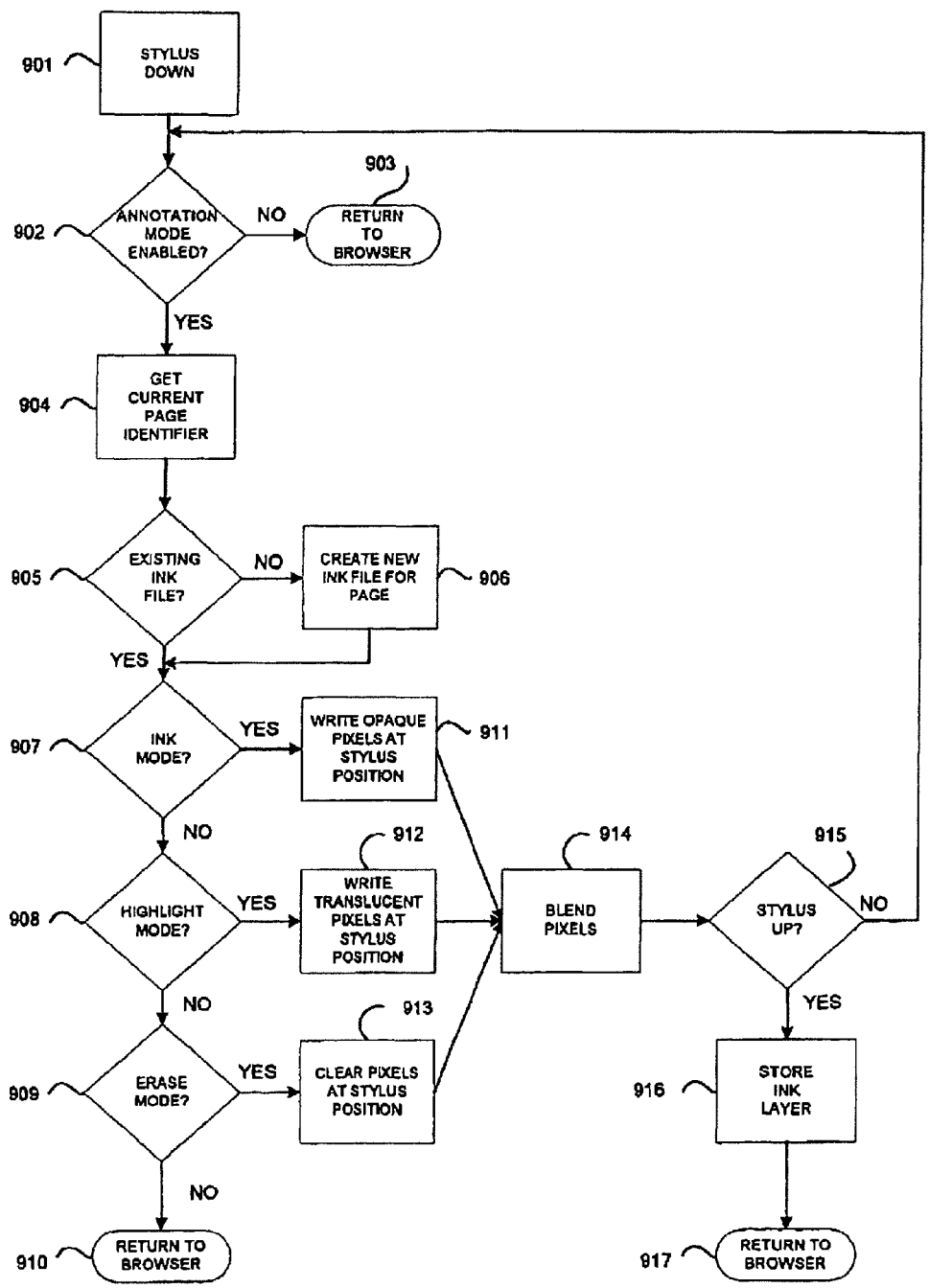
FIG. 9A shows a flowchart indicating various steps that can be executed to provide an annotation function according to certain inventive principles.

FIG. 9A shows a flowchart indicating various steps that can be executed to provide an annotation function according to one embodiment. It will be appreciated that many different approaches for carrying out the inventive principles are possible, and the steps shown are intended to be exemplary only. For example, although the steps are illustrated as being performed sequentially, they can in fact be performed by different components at different times in an object-oriented system using event-driven processing techniques. The steps shown can be implemented in software that is stored on a storage medium such as a disk.

Beginning in step 901, a stylus "down" event is detected. As noted previously, any of various input devices such as a mouse with key clicks or others can be used. In step 902, a test is performed to determine whether the annotation mode has been enabled. (See FIG. 4). If the annotation mode is not presently active, then in step 903 processing returns to the browser (i.e., the stylus movement command is passed through to document browser 801).

In step 904, after it has been determined that the annotation mode is active, the page identifier for the currently displayed page is retrieved. It is contemplated but not necessary that each document page have a unique identifier (e.g., a unique URL). In step 905, a test is performed to determine whether the currently displayed page has a previously existing "ink" or "annotation" file associated therewith. If such an ink file exists, it is retrieved from storage area 805 (see FIG. 8). If no such file exists, a new ink file is created in step 906, preferably using a name that readily corresponds to the displayed document page.

After an ink file has been retrieved or newly created, a test is performed in step 907 to determine whether the annotation mode is "ink" mode. If the current annotation mode is "ink" mode, then in step 911 opaque pixels are written into the ink file at the current stylus position. The number of pixels written can be varied depending on the width or "swath" to be used for the annotation. For a wide swath (e.g., a magic marker type of annotation), a plurality of pixels can be written surrounding the current stylus position. For a narrower swath (e.g., a pinpoint type of annotation), a smaller number of pixels (e.g., one pixel wide) can be written to the annotation file at the current stylus position. It is within the scope of the invention to permit the user to select or change the width of the annotation marks.

In step 914, a pixel blending operation is performed, such that the pixels in the ink file are blended with pixels from the document, which causes the document to be displayed with annotations. (As described above, opaque pixels may entirely replace those in the viewed document). In step 915, a test is performed to determine whether the stylus or other input device has been lifted or disengaged. If so, then in step 916 the ink layer is stored, and processing returns to the browser in step 917. Otherwise, annotations continue at step 902, and can be stored as part of the same stroke. If the user again presses the stylus or input device against the document, then annotations resume in step 901.

Returning to step 907, if the present mode is not "ink" mode, then a test is made in step 908 to determine whether highlight mode was selected. If highlight mode is active, then in step 912 translucent pixels are written at the current stylus position. For example, yellow, pink, or other translucent colors can be stored at the current stylus position. As before, the pixels are blended in step 914, changing the resulting pixels on output but nevertheless permitting the user to see the original document pixels in a modified form. Processing continues as described previously.

In step 908, if highlight mode is not currently active, then in step 909 a test is performed to determine whether erase mode is active. If so, then in step 913 the pixels at the current stylus position are cleared or zeroed out. As with highlight mode, the width of the erasure can be preset to a swath wider than one pixel, and the width can be different than the highlight or annotation pixel width. As before, the remaining non-erased pixels are blended with the original document image in step 914 and processing continues until the ink layer is stored.

Figure 9B:
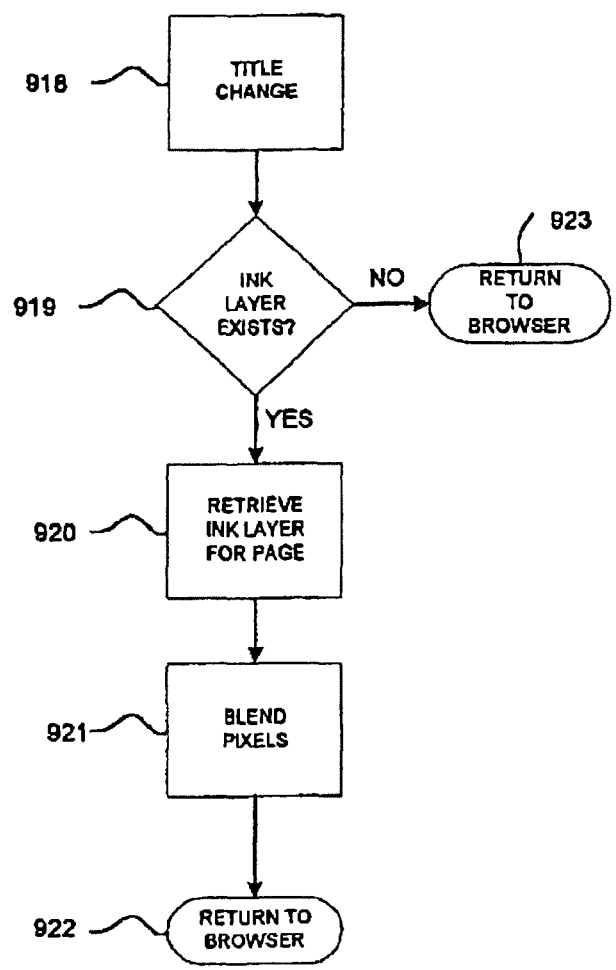
FIG. 9B shows a flowchart indicating how previously created annotations can be superimposed over a document page.

FIG. 9B shows a flowchart indicating how previously created annotations can be superimposed over a document page. In step 918, a title change event is detected in document browser 801, and is sent to annotation editor 803. In various embodiments, a title change event occurs whenever the presently viewed document page changes. This may occur when the user jumps to a new document page, or when the user moves forward or backward among a sequence of related document pages, such as might occur in a book or a set of related hyperlinks. Other types of events, such as a "status change" event, for example, can be used instead of a title change event.

In step 919, a test is performed to determine whether an ink layer already exists for the new document page. If no ink layer exists for the page, processing returns to the document browser and the page is displayed normally. If an ink layer exists for the page, then in step 920 the ink layer is retrieved. In step 921, the pixels from the retrieved ink layer are blended with the displayed page and the resulting image appears on the computer display. Thereafter, processing returns to the browser. A separate ink layer file can be created for each document page, or one ink file can be created for an entire document and indexed according to pages on which the annotations appear. Other approaches are of course possible.

Thus has been described a system, method, and apparatus for annotating electronic document pages using an annotation editor that stores annotations independently of the content of the underlying document. It will be appreciated that many modifications and variations of the invention are possible, and the scope of the invention is not limited by the specific examples and descriptions herein.

We claim:

1. A computer-implemented method of annotating pages of an electronic document independently of the contents of the electronic document, the computer-implemented method comprising the steps of:
    (a) displaying a page of the electronic document on a computer display device using a document browser that permits a user to move forward and backward among a plurality of document pages;
    (b) detecting a selection of an annotation mode that permits the user to annotate the currently displayed document page;
    (c) receiving annotation stroke input from a user input device indicating movement associated with the user input device on the currently displayed document page, wherein the user input device comprises a stylus comprising a first end portion and a second end portion;
    (d) storing annotation stroke data based on the received annotation stroke input, said annotation stroke data comprising data corresponding to the stroke location and the movement associated with the user input device, wherein the annotation stroke data is stored in an annotation file associated with the user, the annotation file stored separate from the electronic document;
    (e) detecting whether the first end portion of the stylus or the second end portion of the stylus is being moved across the computer display device;
    (f) if the first end portion of the stylus is being moved across the computer display device, then selecting an ink annotation mode; and
    (g) if the second end portion of the stylus is being moved across the computer display device, then selecting an eraser annotation mode.

2. The computer-implemented method of claim 1, further comprising the step of blending pixels in the annotation file with pixels in the electronic document to cause the computer display device to display the electronic document with annotations.

3. The computer-implemented method of claim 2, wherein blending pixels comprises execution of an alpha blending function.

4. A computer-readable storage medium storing computer-executable instructions that, when executed by a computer, cause the computer to:
- display a page of an electronic document on a display device using a document browser that permits a user to move forward and backward among a plurality of document pages;
- detect a selection of an annotation mode that permits the user to annotate a currently displayed document page;
- receive annotation stroke input from a user input device, wherein the user input device is a stylus comprising a first end portion and a second end portion, the annotation stroke input indicating movement associated with the user input device on the currently displayed document page; and store annotation stroke data based on the received annotation stroke input, said annotation stroke data comprising data corresponding to the stroke location and the movement associated with the user input device, wherein the annotation stroke data is stored in an annotation file associated with the user, the annotation file stored separately from the electronic document, wherein the computer-readable storage medium is not a signal;
- detect whether the first end portion of the stylus or the second end portion of the stylus is being moved across the display device;
- if the first end portion of the stylus is being moved across the display device, then select an ink annotation mode; and
- if the second end portion of the stylus is being moved across the display device, then select an eraser annotation mode.

5. The computer-readable storage medium of claim 4, storing further computer-executable instructions that, when executed by the computer, cause the computer to blend pixels in the annotation file with pixels in the electronic document to cause the display device to display the electronic document with annotations.

6. The computer-readable storage medium of claim 5, wherein blending pixels comprises execution of an alpha blending function.

7. A computer system for annotating pages of an electronic document independently of the contents of the electronic document, the computer system comprising:
- a display device;
- a user input device, comprising a stylus, wherein the stylus comprises a first end portion and a second end portion; and
- a computing device in communication with the display device and the user input device, the computing device comprising a processor and a memory storing processor-executable instructions that, when executed by the processor, cause the processor to:
- display a page of the electronic document on the display device using a document browser that permits a user to move forward and backward among a plurality of document pages;
- detect a selection of an annotation mode that permits the user to annotate a currently displayed document page;
- receive annotation stroke input from the user input device, the annotation stroke input indicating movement associated with the user input device on the currently displayed document page;
- store annotation stroke data based on the received annotation stroke input, said annotation stroke data comprising data corresponding to the stroke location and the movement associated with the user input device, wherein the annotation stroke data is stored in an annotation file associated with the user, the annotation file stored separately from the electronic document;
- detect whether the first end portion of the stylus or the second end portion of the stylus is being moved across the display device;
- if the first end portion of the stylus is being moved across the display device, then select an ink annotation mode; and
- if the second end portion of the stylus is being moved across the display device, then select an eraser annotation mode.

8. The computer system of claim 7, wherein the memory stores further processor-executable instructions that, when executed by the processor, cause the processor to blend pixels in the annotation file with pixels in the electronic document to cause the display device to display the electronic document with annotations.

9. The computer system of claim 8, wherein blending pixels comprises execution of an alpha blending function.

* * * * *